United States Patent [19]

Shinbori et al.

[11] Patent Number: 4,810,054
[45] Date of Patent: Mar. 7, 1989

[54] FUSION SPLICING METHOD FOR OPTICAL FIBERS

[75] Inventors: Osamu Shinbori, Tokyo; Yoshinori Mimura, Wako; Hideharu Tokiwa, Niza; Tetsuya Nakai, Fujisawa, all of Japan

[73] Assignee: Kokusai Denshin Denwa Kabushiki Kaisha, Tokyo, Japan

[21] Appl. No.: 903,280

[22] Filed: Sep. 3, 1986

[30] Foreign Application Priority Data

Sep. 12, 1985 [JP] Japan .................................. 60-202427

[51] Int. Cl.$^4$ ................................................ G02B 6/38
[52] U.S. Cl. ............................. 350/96.21; 350/96.20; 350/96.34
[58] Field of Search ................ 350/96.21, 96.34, 96.20

[56] References Cited

U.S. PATENT DOCUMENTS 4,666,247  5/1987  MacChesney et al. .......... 350/96.34

Primary Examiner—William L. Sikes
Assistant Examiner—Robert E. Wise
Attorney, Agent, or Firm—Emmanuel J. Lobato; Robert E. Burns

[57] ABSTRACT

A fusion splicing method for optical fibers in which optical fibers are fusion spliced in an inert gas atmosphere after water adsorbed on their surfaces is removed by decomposition in a plasma of an inert gas containing a halogen.

10 Claims, 1 Drawing Sheet

FUSION SPLICING METHOD FOR OPTICAL FIBERS

BACKGROUND OF THE INVENTION

The present invention relates to a fusion splicing method for optical fibers.

The transmission loss of a quartz glass fiber has now been reduced as low as 0.2 dB/km (substantially equal to its theoretical value) at a 1.55 μm wavelength; this has made possible transmission without any repeater over a distance of 100 km. Furthermore, it is predicted, theoretically, that the transmission loss of a fluoride glass fiber of $ZrF_4$, $HfF_4$ series will be 0.01 dB/km or less in a 2 to 4 μm wavelength band, and it is now drawing attention as an optical fiber of the next generation.

With such a low transmission loss of the filter as mentioned above, an optical signal could be transmitted over several thousand kilometers without regenerative or amplifying repeating of the signal.

At present, however, the length of a one-piece fiber which can be produced even by the most advanced quartz fiber manufacturing technique is in the order of 100 km at best, and techniques capable of fabricating a fiber 1000 km or more in length have not yet been established. In addition, a fiber which has sufficient required strength in its entire length for incorporation into a cable is 10 to 20 km at the longest, so that in even a system of a 50 km or so transmission distance is forced to have at least several joints of optical fibers. Accordingly, as the transmission loss of the optical fiber is reduced, an optical fiber splicing technique for low loss and high strength splicing acquires a greater importance.

The most common method that is now employed for splicing optical fibers of quartz system is a fusion splicing method, in which two fibers to be spliced are butted tightly at one end and the butted end portions are fused together. With this method, the splice loss is low and very small in aging with time; hence this method has been one of factors in the development of optical communications so far. However, this method possesses a defect such that the strength of the joint decreases to ⅓ to 1/5 the strength of fiber strands. This is ascribed to the fact that water adsorbed on the fiber surface causes the formation of crystallites during the fusion splicing process.

Moreover, it is considered that fusion splicing of fluoride glass fibers is difficult because when heated in the air, fluoride glass crystallizes before it softens.

Factors contributing to the crystallization of the fluoride glass fall into the basic one in which the glass crystallizes by its own instability and the external one in which oxygen or water vapor contained in the atmosphere, or water adsorbed on the glass surface reacts with the glass to form crystal nuclei which grow into crystals.

With respect to the former, our studies on the viscosity temperature characteristics of glass of various compositions and the crystallization temperatures thereof have revealed that short-time heating in an inert gas atmosphere would not cause the crystallization as long as the composition of the glass used falls within the range in which fibers can be produced; this means that the fusion splicing of the fluoride glass fibers has no inherent disadvantage.

Therefore, it is necessary only to completely remove impurities such as water adsorbed on the glass surface, which forms the external cause of the crystallization, and to perform the fusion splicing in an inert gas atmosphere.

Also in the case of the quartz glass fiber, the removal of water adsorbed on the glass surface would suppress the formation of crystallites, permitting high-strength fusion splicing.

At present, heat treatment of the glass in a dry atmosphere or in a vacuum is the most effective for the removal of the impurities such as water adsorbed on the glass surface. However, this method cannot be applied to a material which reacts with water or like impurities and crystallizes even at low temperatures. Further, even the quartz glass fiber which is stable thermally is impossible of sufficient dehydration because heating of its butted portion to a temperature for dehydration will degrade its resin coating. Thus no effective means is available, at present, for completely removing the adsorbed water and like impurities from the glass fiber of its butted portion to obtain a clean glass surface.

SUMMARY OF THE INVENTION

An object of the present invention is to provide a high-strength, low-loss fusion splicing method for quarts and fluoride glass fibers. The fusion splicing method of the present invention is characterized in that impurities such as water adsorbed on the fiber surfaces near the butted portion of the fibers to be connected are removed through use of a plasma of an inert gas containing a halogen, after which their fusion splicing is performed by an arc discharge, or through use of infrared light such as $CO_2$ laser light, in an atomsphere of an inert gas such as argon, helium or the like.

By treating the fiber surfaces in a plasma containing a halogen, as mentioned above, the halogen in its nascent state reacts, at a range of low temperature, with impurities on the fiber surfaces and is decomposed into materials which have a small energy of adsorption on glass, such as hydrogen halide or oxygen; accordingly, adsorbed water and other impurities on the fiber surfaces can easily be removed at a range of low temperature, permitting the fusion splicing of the fluoride glass fibers which has been difficult in conventional art. Moreover, high-strength fusion splicing of the quartz fibers also becomes possible.

The principles of the present invention will be described first with reference to the reaction of the fluoride glass with water on the glass surface. The reaction of the fluoride glass with water basically proceeds in accordance with the following reaction formula (11 ):

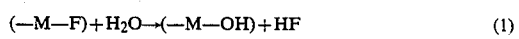
(1)

where M indicates a metallic element forming the glass. Further,—in the above formula means a bond; for example, when M is zirconium (Zr), the formula (1) becomes as follows:

(2)

This reaction does not occur at room temperature but proceeds as temperature rises.

Therefore, as the water on the fiber surface is heated, the metal M forming the fluoride glass becomes a hydroxide, which forms a nucleus for crystallization.

On the other hand, when a halogen in the nascent state exists, the water reacts with highly reactive nascent halogen atoms even at a range of low temperature and is decomposed into hydrogen halide and oxygen, as indicated by the following formula (3):

$$H_2O + 2X \rightarrow 2HX + (\tfrac{1}{2})O_2 \qquad (3)$$

The hydrogen halide and oxygen thus formed by decomposition are far smaller than the water in the energy of adsorption on the glass, and hence leave the glass surface even at low temperatures. That is, the treatment of the glass in the presence of nascent halogen atoms enables the water adsorbed on the glass surface to be removed with ease even at a range of low temperature.

The nascent halogen atoms can easily be created, even at a range of low temperature, by ionizing an inert gas containing halogen gas or halogenated gas, into a plasma through a radio-frequency glow discharge or the like.

Accordingly, fluoride glass fibers can be fusion spliced by the following steps: At first, two fibers to be joined are butted together tightly with no fiber axis deviation therebetween, and the pressure in a splicing vessel is evacuated. Then, water adsorbed on the glass surfaces is removed by generating a plasma of an inert gas containing halogen gas or halogenated gas, and an inert gas dried for avoiding re-adsorption of water is introduced into the vessel to the atmospheric pressure, in which the butted portion of the fibers is heated.

Also in the case of the quartz glass fiber, water adsorbed on the glass surface can be removed by the reaction indicated by the formula (3), by which the formation of crystallites can be suppressed, making it possible to achieve high-strength fusion splicing.

BRIEF DESCRIPTION OF THE DRAWING

The present invention will be described in detail below with reference to the accompanying drawing of single FIG. 1 which is a schmematic diagram illustrating a specific operative example of the splicing apparatus for performing the present invention.

DETAILED DESCRIPTION

Figure 1:
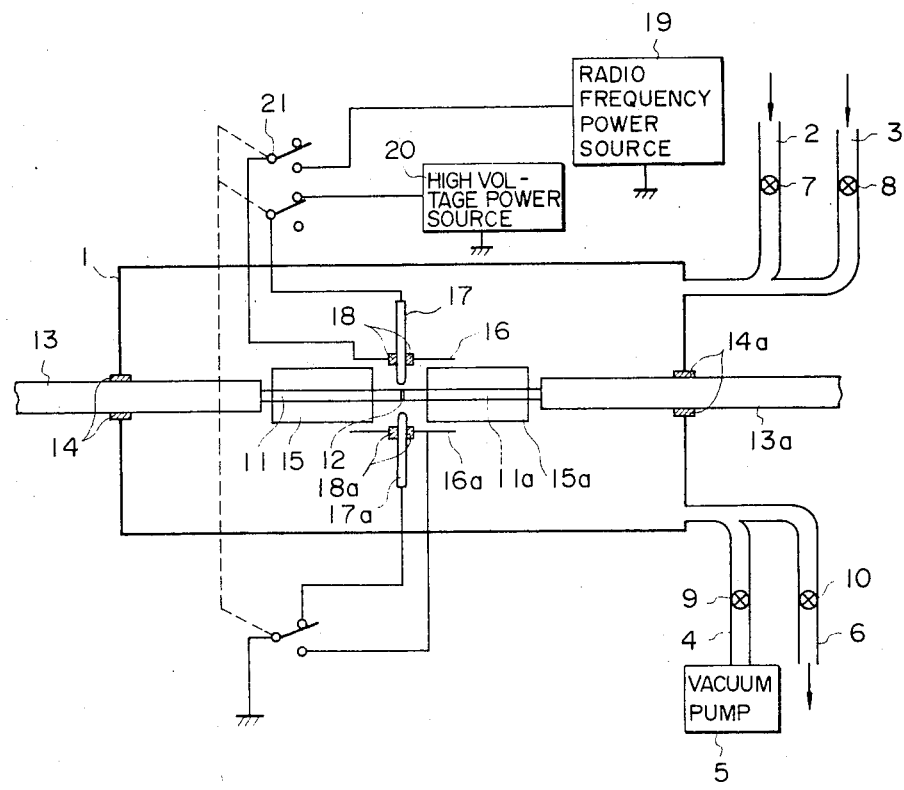

In FIG. 1, reference numeral 1 indicates a splicing vessel which can be evacuated to a vacuum, 2 an inlet port for halogen gas or halide gas, 3 an inlet port for an inert gas, 4 a vacuum exhaust port, 5 a vacuum pump, 6 an exhaust port, 7, 8, 9 and 10 stop valves, 11 and 11a fibers, 12 a joint of the fibers, 13 and 13a fiber coatings, 14 and 14a packings for maintaining a vacuum in the splicing vessel, 15 and 15a jigs for adjusting the fiber axes, 16 and 16a electrodes for generating a plasma, 17 and 17a reidle electrodes for producing an arc discharge, 18 and 18a insulators for insulating the electrodes 16 and 17 from each other, 19 a radio-frequency power source for creating the plasma, 20 a high-voltage power source for generating the arc discharge, and 21 a switch for switching between the radio-frequency power source and the high-voltage power source.

In the splicing of the fibers 11 and 11a, the fibers stripped of coatings on their top end portions are fixed to the fiber centering jigs 15 and 15a, by which the end faces of the fibers are contacted tightly without a gap therebetween and their optical axes are adjusted into alignment with each other. The vessel 1 is evacuated by the vacuum pump 5 to a vacuum of approximately 0.001 Torr, after which argon or like inert gas containing halogen gas or halide gas is introduced from the gas inlet port 2 into the splicing vessel 1 to raise its inside pressure to 0.1 to 0.01 Torr. After this, radio-frequency power is applied via the switch 21 to the electrodes 16 to create a plasma, by which impurities on the surfaces of the fibers 11 and 11a are removed. Then, the stop valves 7 and 9 are closed but instead the other stop valves 8 and 10 are opened to introduce pure argon or a similar inert gas from the inert gas inlet port 3 into the vessel 1 to increase its inside pressure to one atmosphere pressure, at which an arc discharge is produced, thereby fusion splicing the fluoride glass fibers.

It has been ascertained by experiments on this embodiment that the fusion splicing of fluoride glass fibers can be achieved which has been regarded as impossible with the prior art.

As described above, according to the present invention, optical fibers are fusion spliced after chemically removing, at a low temperature, impurities such as water adsorbed to the glass surface in a plasma containing a halogen; so the invention permits the fusion aplicing of fluoride glass fibers which could not have been achieved in conventional art. Also in the fusion splicing of quartz glass optical fibers, the present invention is capable of preventing the joint strength from being diminished by adsorbed water on the glass surface, making it possible to fusion splice the optical fibers with substantially the same strength as that of the fiber strands.

What we claim is:

1. A method of fusion splicing optical fibers comprising the steps of:
   removing water adsorbed on surfaces of optical fibers to be fusion spliced including end surfaces of the optical fibers by confining end portions of the optical fibers in a plasma of a gas containing a halogen and effecting decomposition of the water adsorbed; and
   fusion splicing abutted ends of the end portions of the optical fibers in an atmosphere of dry gas.

2. A method of fusion splicing optical fibers according to claim 1, in which said plasma is generated through a radio frequency glow discharge.

3. A method of fusion splicing optical fibers according to claim 1, in which said fusion splicing is effected by subjecting said abutted ends to an arc discharge.

4. A method of fusion splicing optical fibers according to claim 1, in which said end portions of the optical fibers are stripped of coatings prior to subjecting them to said plasma.

5. A method of fusion splicing optical fibers according to claim 1, in which said plasma and said end portions are confined in a vessel, and to which said vessel a vacuum is applied prior to introduction of gas for generating said plasma.

6. A method of fusion splicing optical fibers according to claim 1, in which said plasma is effective to decompose said water and other impurities at a low temperature.

7. A method of fusion splicing optical fibers according to claim 1, in which said optical fibers are fluoride glass optical fibers.

8. A method of fusion splicing optical fibers according to claim 1, in which said optical fibers are quartz optical fibers.

9. Spliced optical fibers fusion spliced by the method of fusion splicing optical fibers according to claim 1.

10. A method of fusion splicing optical fibers according to claim 1, in which said gas containing a halogen is an inert gas containing a halogen.

* * * * *